M. P. WILMARTH.
Belt-Twisting Apparatus.

No. 164,702. Patented June 22, 1875.

UNITED STATES PATENT OFFICE.

MOSES P. WILMARTH, OF PAWTUCKET, RHODE ISLAND, ASSIGNOR TO JAMES DAVIS & SON, OF SAME PLACE.

IMPROVEMENT IN BELT-TWISTING APPARATUS.

Specification forming part of Letters Patent No. 164,702, dated June 22, 1875; application filed May 10, 1875.

*To all whom it may concern:*

Be it known that I, MOSES P. WILMARTH, of Pawtucket, in the county of Providence and State of Rhode Island, have invented certain Improvements in Belt-Twisting Apparatus, of which the following is a specification:

My said invention relates to a simple and effective means for twisting belts or for making round belting; and consists of a reel hung in a revolving rack, the latter having a tubular projection, in which there is inserted a spindle, so constructed as to form a tension to govern the outward-moving belt, and over which said belting material passes to a receiving-drum, around which the completed belt is wound.

The accompanying drawing is hereby made a part of this specification, similar letters of reference indicating corresponding parts.

Figure 1:
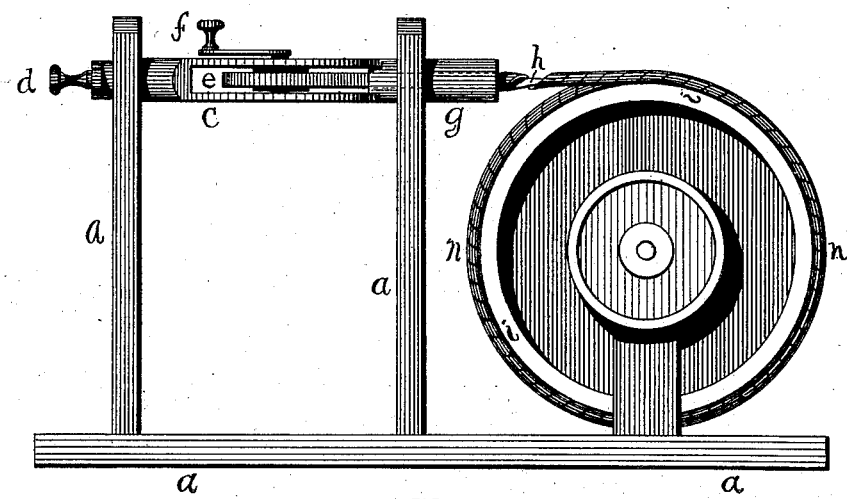
Figure 2:
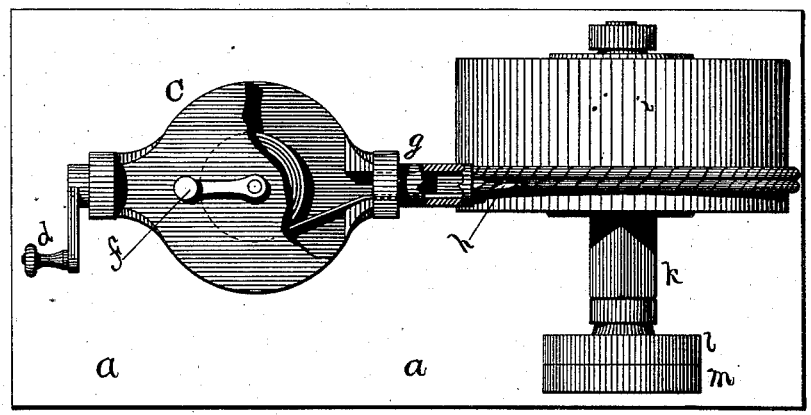

Figure 1 of said drawing is a side view of said device, and Fig. 2 a top view thereof.

$a\ a$ are the base and uprights, which support the operating parts. $c$ is the revolving rack, and $d$ is the handle or crank by which the same is turned. $e$ is the interior reel on which the belting material is coiled; and $f$ is a crank or handle by which said reel is operated, as hereinafter mentioned. $g$ is the tubular projection above mentioned. $h$ shows the said spindle; and $i$ a revolving drum, which receives the completed belt, $k$ representing the shaft of said drum, and $l\ m$ the tight and loose pulleys connected therewith. $n$ shows the completed belt wound onto the circumference of said receiving-drum $i$.

The operation of said device is substantially as follows: The belting material is to be first coiled on the reel, to facilitate which is the office of the handle or crank $f$. One end of the belting material is then passed through the hollow projection $g$ and under the inserted end of the spindle $h$. A turn of said belting material is then made around the projecting end of said spindle, and subsequently fastened into the circumference of the receiving-drum $i$. Now, while said drum is being revolved by means of power received through the pulleys aforesaid, the rack $c$ and its contents are turned by means of the crank or handle $d$, and in a direction at right angles with the line of the revolution of said drum $i$. The effect of these combined and simultaneous movements is to give the belt an even and solid twist, and to make the same completely round in form and appearance.

The tension of the outward-moving belting is governed by the pressure upon it of the inserted end of the spindle $h$, and this may be regulated at the will of the operator.

I claim as my invention, and desire to secure by Letters Patent—

In belt-twisting apparatus or machines for twisting belts, the combination of the revolving rack $c$, provided with the reel $e$, tubular projection $g$, and inserted spindle $h$, with the receiving-drum $i$, all substantially as shown, and for the purpose described.

MOSES P. WILMARTH.

Witnesses:
THOS. P. BARNEFIELD,
GEORGE W. BARNEFIELD.